(12) United States Patent
Castor

(10) Patent No.: US 6,362,750 B1
(45) Date of Patent: Mar. 26, 2002

(54) PROCESS AND DEVICE FOR AUTOMATICALLY SUPPORTED GUIDANCE OF AIRCRAFT TO A PARKING POSITION

(75) Inventor: Robert Castor, Unterschleissheim (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/544,569

(22) Filed: Apr. 6, 2000

Related U.S. Application Data

(63) Continuation of application No. PCT/DE98/02798, filed on Sep. 21, 1998.

(30) Foreign Application Priority Data

Oct. 6, 1997 (DE) .......................................... 197 44 034

(51) Int. Cl.[7] ........................... G08B 21/00; G08G 5/00
(52) U.S. Cl. ...................................... 340/958; 348/117
(58) Field of Search ............................... 340/958, 945, 340/971, 932.2; 244/114 R; 342/66, 23; 348/117

(56) References Cited

U.S. PATENT DOCUMENTS

| | | | | |
|---|---|---|---|---|
| 3,706,969 A | * | 12/1972 | Paredes ........................ | 340/26 |
| 5,657,077 A | | 8/1997 | DeAngelis et al. ......... | 348/157 |
| 5,664,227 A | * | 9/1997 | Mauldin et al. ............. | 395/778 |
| 5,675,661 A | * | 10/1997 | Richman et al. ............ | 340/958 |
| 5,689,442 A | * | 11/1997 | Swanson et al. ............ | 340/500 |
| 5,974,158 A | * | 10/1999 | Auty et al. .................. | 382/103 |

FOREIGN PATENT DOCUMENTS

| | | |
|---|---|---|
| DE | 4009668 | 10/1991 |
| DE | 19602607 | 8/1997 |
| EP | A 0 459295 | 12/1991 |
| EP | A 0 594116 | 4/1994 |
| WO | WO 96/09207 | * 3/1996 |
| WO | WO 96/20465 | 7/1996 |
| WO | WO 97/32291 | 9/1997 |

* cited by examiner

Primary Examiner—John A. Tweel
(74) Attorney, Agent, or Firm—Sughrue Mion, PLLC

(57) ABSTRACT

A process and a device for automatically supported guidance of aircraft to a parking position permitting a required increase in safety and organized and largely centralized monitoring and control. This process automatically transmits correction instructions for direction and speed to a control of an aircraft. An aircraft located at a parking position situated within a detection area of at least one video camera is detected by the video camera. The signals supplied by the video camera are processed in an evaluation unit to determine the current position of the aircraft and the correction instructions to reach a predefined position. The signals are also processed into video sequences. The correction instructions are transmitted to the aircraft control. The video sequences are made available for integrated display on a control monitor together with additional monitoring data. The video sequences are stored on a storage medium so as to be recallable.

13 Claims, 4 Drawing Sheets

PROCESS AND DEVICE FOR AUTOMATICALLY SUPPORTED GUIDANCE OF AIRCRAFT TO A PARKING POSITION

This is a Continuation of International Application PCT/DE98/02798, with an international filing date of Sep. 21, 1998, the disclosure of which is incorporated into this application by reference.

FIELD OF AND BACKGROUND OF THE INVENTION

The invention relates to new and useful improvements in methods and systems for guiding an aircraft to a parking position.

German Patent DE 40 09 668 A1, for example, discloses a process and a device for the positionally precise parking of airplanes. The current position of an airplane is continuously determined by evaluating at least one signal field which is at least one-dimensional. This signal field is produced by the airplane and measured through the air by a detector. After evaluation of the signals, instructions are issued to correct the position of an aircraft. The sensor arrangement of this device is proposed to include a video camera, the signals of which are compared with reference fields to determine the position corrections. Signal display panels that can be optically recognized by the aircraft pilot serve as output. This prior art process eliminates the use of pressure detectors, induction loops, and the like.

At modern airports, aircraft that have landed are to be guided to an exact stop position as quickly as possible and largely automatically. Typically, the stop position is determined with reference to an airport terminal, known as a gate.

The prior art process and the prior art device, using a video camera and a signal display panel, basically solve this problem by means of a closed system. The signal field provided by the video camera is compared with reference signal fields, and the corrections are determined and displayed. The prior art system has disadvantages with respect to safety since checking and monitoring are complex. In accordance with current practice, the control personnel have assignment and planning data as well as basic parameters available on control monitors. The prior art positioning process using the described device is executed independently thereof. Any checking required is, at the most, possible via additional technical units and any intervention can, at the most, be carried out via conventional communications paths. Beyond that, central management of a plurality of assignment events integrating the prior art positioning process is not possible since no information coupling is provided. Finally, the prior art processes and devices permit subsequent analysis of the execution of parking events, e.g., for statistical purposes or to determine error sources, causes of accidents, etc.

OBJECTS OF THE INVENTION

Against this background, one object of the present invention is to provide a process and a device for automatically supported guidance of aircraft to a parking position that permit a required increase in safety. Another object of the invention is to provide such a process and device that allow for organized and largely centralized monitoring and control. Yet another object is to provide such a process and device that support subsequent analysis of completed parking events.

SUMMARY OF THE INVENTION

According to one formulation, the invention is directed to a process for automatically supported guidance of aircraft to a parking position wherein the process automatically transmits correction instructions for direction and speed to a control of an aircraft. At least one video camera detects an aircraft located within a parking zone that is situated within a detection area of the at least one video camera. The signals supplied by the video camera are processed in the evaluation unit both to determine the current position of the aircraft and the correction instructions to reach a predefined position. The video signals are also, in the evaluation unit, processed into video sequences. The correction instructions for transmission to the aircraft control and the video sequences are made available for integrated display together with additional monitoring data on a control monitor, whereby the video sequences are stored on a storage medium so as to be recallable.

The possibility of recalling video sequences to visually monitor a parking event from a control station is integrated into the sequence of determining and transmitting correction instructions. This process according to the invention thus permits control personnel from a central control station at which the typical assignment and planning data, monitoring parameters, etc. are displayed, to inspect video sequences on the same control monitor in order to be able to verify the correct and orderly sequence of a planned parking event. Typically, the control personnel belongs to a ground control or ground service group and is entrusted with the organization and assignment management of an air terminal. Important, in particular, is the capability of storing video sequences on a storage medium so that they are recallable. Storage is carried out in such a way that the video sequences correspond to a concretely executed parking event. That is, during storage, the video sequences are archived such that they can be called up and redisplayed on a monitor with respect to, for example, date, aircraft identification number, parking event, etc.

The process according to the invention, on the one hand, substantially increases safety and thus meets the current requirement for processing reliability due to increased air traffic. On the other hand, the process according to the invention permits completely centralized management. The archived storage of video sequences permits their display, i.e., analysis, on a monitor at any time after completion of the respective parking events. Video sequences can thus be automatically analyzed, e.g., by programs that determine control parameters based on a comparison of a plurality of video analyses. However, video sequences of completed parking events may also be simply visualized to determine, for example, the causes of an accident.

According to a particularly advantageous aspect of the invention, the video sequences that are to be stored are compressed. This process according to the invention greatly reduces the amount of data to be stored.

Advantageously, the video sequences may be stored on mobile storage media so that the stored units can be kept in a safe place or visualized at different workstations. The invention makes it possible to store, process, keep, and recall the video sequences completely independent from the actual system used for video monitoring and control of aircraft. The video sequences are preferably available in digital form. Thus, the video monitoring includes the processing area to determine the current position of the aircraft with the aid of at least one video camera starting from a certain position in which the aircraft reaches the parking zone. The parking zone is detected by the video camera.

The current aircraft position is processed with respect to position and alignment and compared with set point values in order to calculate and display instructions with respect to changes in direction and speed. The invention proposes that the aircraft type also be determined automatically, in addition to the positional data. The aircraft type affects the calculation of correction values since different aircraft types behave differently with respect to speed and directional changes. Accordingly, the correction values can be influenced by different type references. The invention furthermore proposes that the video detection includes total object detection within the parking zone area. All static or dynamic objects in the parking zone area are detected and identified. The system can thus identify service vehicles, equipment, etc. by means of predefined and stored reference signals and take these into account for aircraft guidance.

The invention furthermore proposes that the signals of two video cameras that are arranged in parallel with respect to the optical recording area be evaluated. On the one hand, redundancy of the sensor mechanisms substantially increases safety. On the other hand, redundancy of the sensor mechanisms permits possibilities like functional self-checking by the system, selection of the suitably positioned sensor as a function of the size of the aircraft, etc. The at least two video cameras are preferably arranged at a predefined distance one above the other. The cameras are preferably mounted on the outside of the air terminal in an imaginary straight line through the aircraft's stopping point and its route of travel shortly before the stopping position.

Advantageously, the video sequences are made available as digital sequences. This makes it possible to position the video sequences on the control monitor with respect to position, size, and zoom factor. This modular approach allows control personnel to arrange the monitoring data, video sequences, planning data, etc. with respect to position and size on the control monitor depending on their current importance.

Advantageously, it is furthermore proposed to make the video sequences of different terminals available for call-up as required. The controller can thus switch between different terminals or simultaneously position several video sequences on his/her monitor.

This storage option according to the invention represents a significant safety factor, since the stored video sequences can be used to sensitize the recording system, to improve the correction calculations, and subsequently to review parking events that may have been incorrectly executed.

Advantageously, the data of video cameras of different parking zones are processed in one evaluation unit. This multi-zone capability improves coordination and controllability and increases the economic efficiency of the system.

According to another embodiment, the correction values are optically transmitted to the aircraft pilot. Particularly suitable are signal display panels capable of displaying readily recognizable signals for direction, left/right, speed of forward travel, and stop.

Particularly advantageously, it is proposed that environmental parameters, such as light, temperature, visibility conditions, etc. be detected and taken into account either when determining the correction values and/or when enhancing the video sequences in terms of filtering to increase visibility.

The invention thus provides a process that permits largely automatic guidance of the precise positioning of an aircraft in the last phase of a parking event. In addition, the invention permits central monitoring, control, and central management. This process can be executed by simple and economical means. For signal transmission, conventional line transmission techniques including glass fiber optics as well as conventional radio transmission, including the use of mobile radio communications systems, are available. Safety is ensured by the storage capability.

The invention further relates to a device for automatically supported guidance of aircraft to a parking position. The device includes at least one video camera mounted in the parking zone area and an evaluation unit connected therewith to provide video sequences and to evaluate the video signals. By evaluating the video signals, correction values for guiding the aircraft are determined. The device also includes a signal transmission unit to transmit the correction values to the aircraft, a video sequence transmission unit to make the video sequences available for call-up by control personnel, and a storage unit to store the video sequences.

The device according to the invention on the air terminal side includes at least one video camera as a sensor input and at least one transmission unit for the correction values. According to one embodiment of the invention, an optical signal display panel may be used as the transmission unit. Alternative signal transmission options may also be used.

For the storage media, in particular, compact disks, floppy disks, JAZ, etc. may be used. Tape systems and the like, may also be used.

Advantageously, it is proposed to arrange two video cameras within the parking zone area with substantially identical detection areas. The two cameras can be positioned, for example, vertically one above the other at a predefined distance from each other, and they can be aligned in parallel. Depending on the size of the aircraft, the upper camera may be used for larger aircraft and the lower for smaller aircraft. The cameras may also be simultaneously used for system checking and/or for redundancy to increase system reliability.

The evaluation unit, advantageously, includes a computer having, for example, a multiplexer for the video cameras, a frame grabber for edge detection, a processor for data evaluation and setpoint determination, a memory, and the required output interfaces.

According to one embodiment of the invention, several evaluation units can be linked to a central unit to permit central use of common units, e.g., common memories, processors for special calculations, etc.

According to a particularly advantageous embodiment of the invention, the device includes a control unit, for example a computer, comprising at least one control monitor used for the integrated display of monitoring and planning data as well as video sequences.

According to a further advantageous embodiment of the invention, the control unit is linked to an airport management system permitting the exchange of assignment data, planning data, and budgeting data, etc. The management system can thus provide, for example, aircraft related information, such as airline, flight number, aircraft type, etc. and make it available through the control unit or directly to the evaluation unit. The latter can then take this data into account when determining the correction values without having to identify the aircraft. This will, among other advantages, substantially increase the speed of aircraft identification as well as ensure an increase in safety.

According to a further advantageous proposal, the device comprises a storage unit for archived storage of video sequences. These video sequences are thereby rendered available for subsequent analysis for various purposes.

Finally, the invention provides an operator panel in the area of the signal transmission unit for an on-site operator.

An operator located in the area of the air terminal can thus issue direct signals via the signal transmission unit to the pilot, e.g., if the system fails or if other safety considerations make this necessary.

The invention provides a modular and clearly organized device for automatically supported guidance of aircraft to their parking position. In addition, the invention achieves a high degree of operational safety, and allows for the integration of video monitoring into the data overview for control personnel.

Another aspect of the invention is directed to improving management and organization of the parking areas at airports. More specifically, the invention is further directed to a management system for operating the automatically supported guidance of aircraft to a parking position in accordance with the processes and the devices described above. The management system includes, in addition, a central control unit with a monitor. The monitor is structured for the integrated display of monitoring data and the video sequences made available by the evaluation unit. The evaluation unit evaluates the video signals supplied by at least one video camera in the parking zone area. The management system also includes input and output units, a computer, and a storage unit for the video sequences.

The management system according to the invention permits integrated monitoring and control of the parking sequence from central workstations. This provides a number of safety-related and economic advantages. From central control units, appropriately trained personnel are able to plan and monitor terminal assignment, which is possibly integrated into the management system of the entire ground control. Simultaneously, the personnel can recall video sequences for visual monitoring of automatically guided parking events. They can also directly influence the signal transmission units, if this is necessary, for safety related or other reasons.

According to an advantageous embodiment of the invention, the management system includes a feature of selecting a parking zone in order to view the corresponding video sequences. According to a further embodiment of the invention, the positions and sizes of the data displays and the displays of the video sequences can be varied. This option allows the controller to call up, as required, only data, only video sequences, and/or several data/video sequence groups, and so forth on his/her control monitor.

According to the invention, the management system includes the option to store and call up transmitted video sequences for different purposes.

Finally, the management system permits the transmission of correction instructions to override and/or supplement the automatically determined correction instructions.

The management system according to the invention makes it possible to integrate into an airport's monitoring and planning system the processes and the devices for automatically supported guidance of aircraft to their parking position by simple and effective means.

BRIEF DESCRIPTION OF THE DRAWINGS

Additional advantages and features of the invention are explained in more detail in the description provided below with the aid of the drawings. The drawings show.

DETAILED DESCRIPTION OF THE PREFERRED EMBODIMENTS

Figure 1:
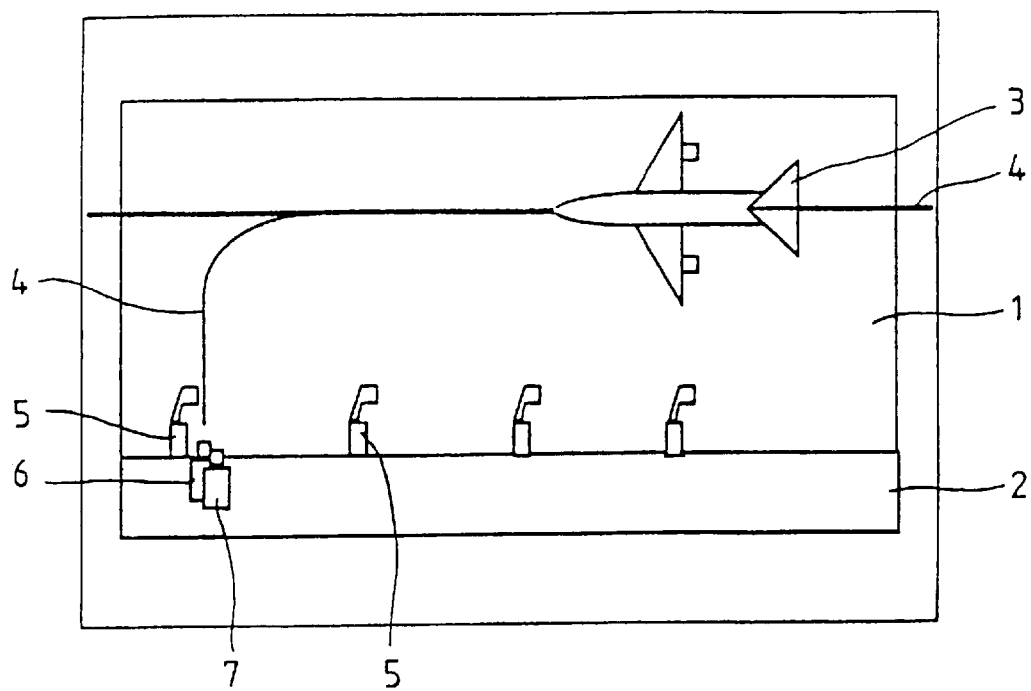
FIG. 1 a schematic representation of the operational situation on the apron of an airport, FIG. 2 a representation of an exemplary embodiment of a parking event, FIG. 3 a representation of the arrangement of the video cameras, FIG. 4 a schematic representation of an organizational gate-planning schematic using the invention, and FIG. 5 a schematic representation of a video sequence.

FIG. 1 is a rough overview of an apron situation at an airport. In apron area 1 in front of a terminal building 2, an aircraft 3 is located on a taxiway, typically marked by lines on the ground. Taxiway 4 is supplemented by the lines leading to individual gates 5.

In the area of each gate, two video cameras 6, 7 are essentially arranged one above the other and parallel to each other. In the present case, it is assumed that gate planning has assigned incoming aircraft 3 to the gate that is shown in FIG. 1 on the far left. Approximately when aircraft 3, after turning off from the straight taxiway, has reached the straight line leading to gate 5, automatic detection, evaluation, and guidance of the aircraft start.

Figure 2:
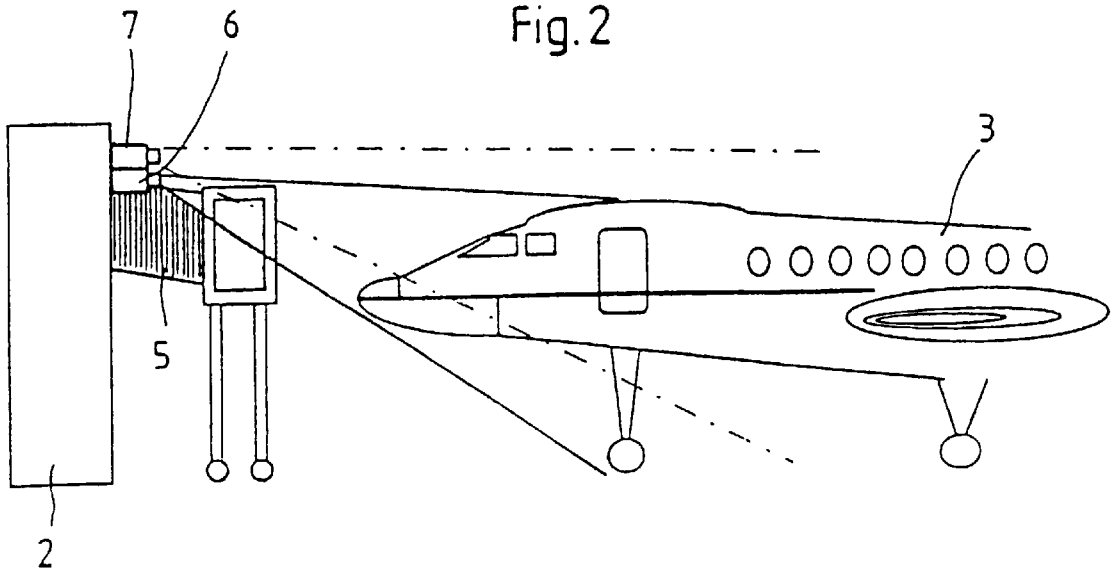

This situation is roughly shown in a side view in FIG. 2. In this exemplary embodiment, the lower camera No. 6 of the two cameras is used. The two cameras can be used completely redundantly, simultaneously, sequentially or as a function, for example, of the aircraft's size.

Figure 3:
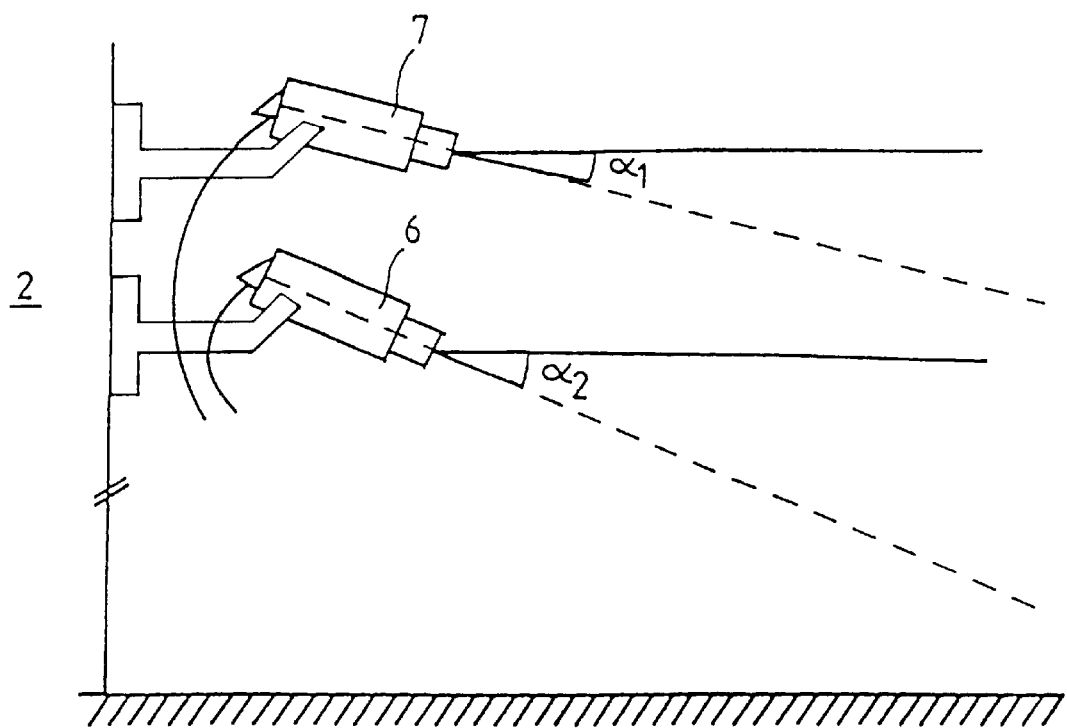

FIG. 3 schematically shows the arrangement of cameras 6 and 7. These cameras are arranged substantially one above the other and substantially parallel to each other, but the detection angles $\alpha 1$ and $\alpha 2$ are different. In the embodiment shown, the detection angle $\alpha 1$ of the upper camera 7 is smaller than the detection angle $\alpha 2$ of the lower camera. A mounting height of approximately 12 m has proven to be suitable for the lower camera.

Figure 4:
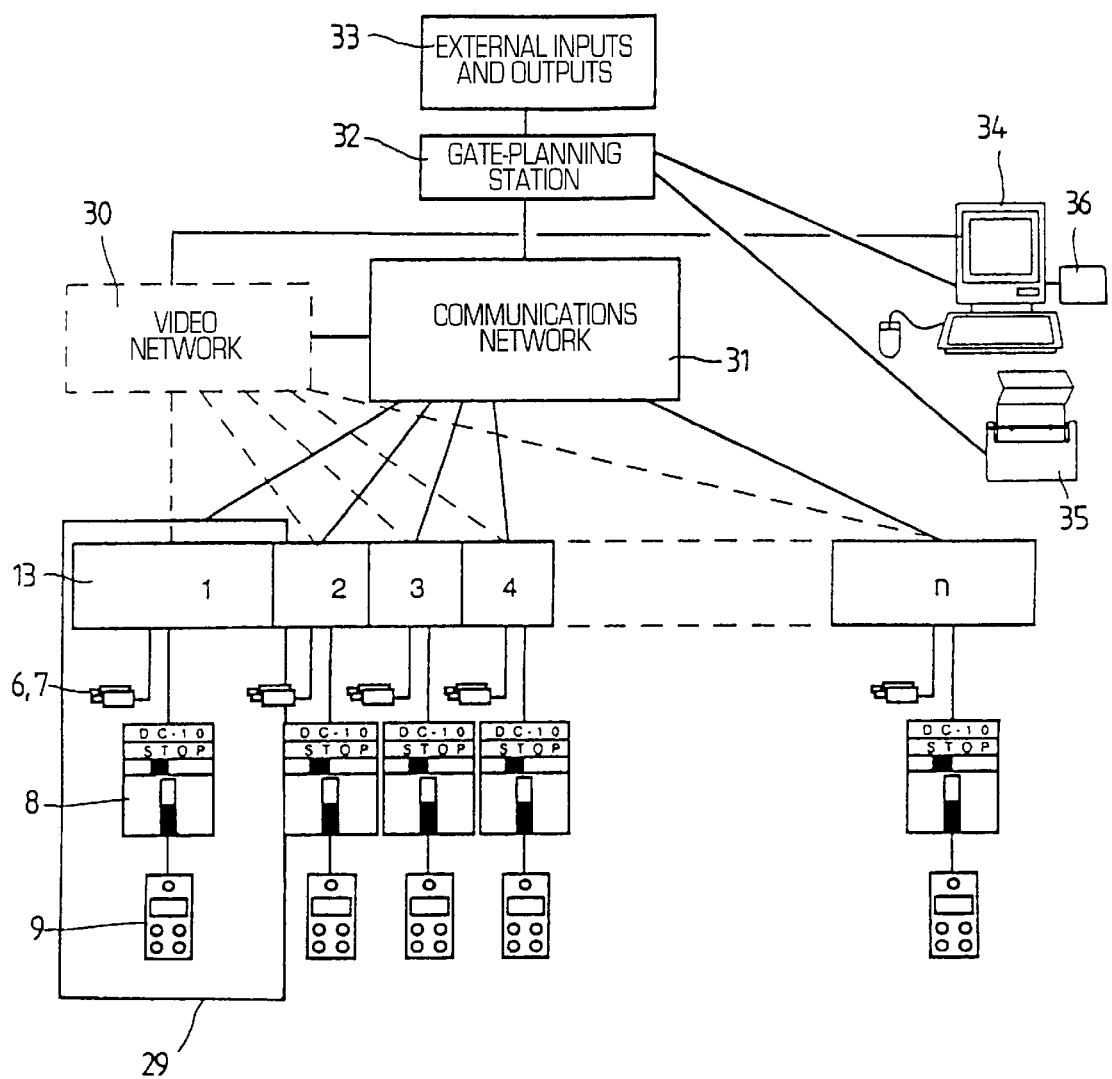

FIG. 4 schematically shows the layout of a system at an airport according to one preferred embodiment of the invention. Reference numeral 29 identifies the system of a station or a gate. This system comprises the two cameras 6 and 7, the display panel 8, the operator panel 9, and an evaluation unit 13. A plurality of such systems 1 to n are arranged at the different gates 1 to n. All of these systems are connected with a communications network 31 for data exchange, preferably via serial links, and with a video network 30 for video sequence exchange. The video network can also be organized via optical links such that digitization for video sequence display is not carried out until subsequently, e.g., at the workstation computer of the controller. The controller sits at a gate-planning station 32. External inputs and outputs 33 are connected in addition to a computer workstation 34 and a printer 35. The controller at computer workstation 34 can display both data and video sequences. Preferably, Windows technology is used for this purpose so that position, size, etc. of the individual displays can be defined. Storage unit 36 is arranged at the computer workstation. It can also be integrated into the workstation, e.g., in the computer enclosure.

Figure 5:
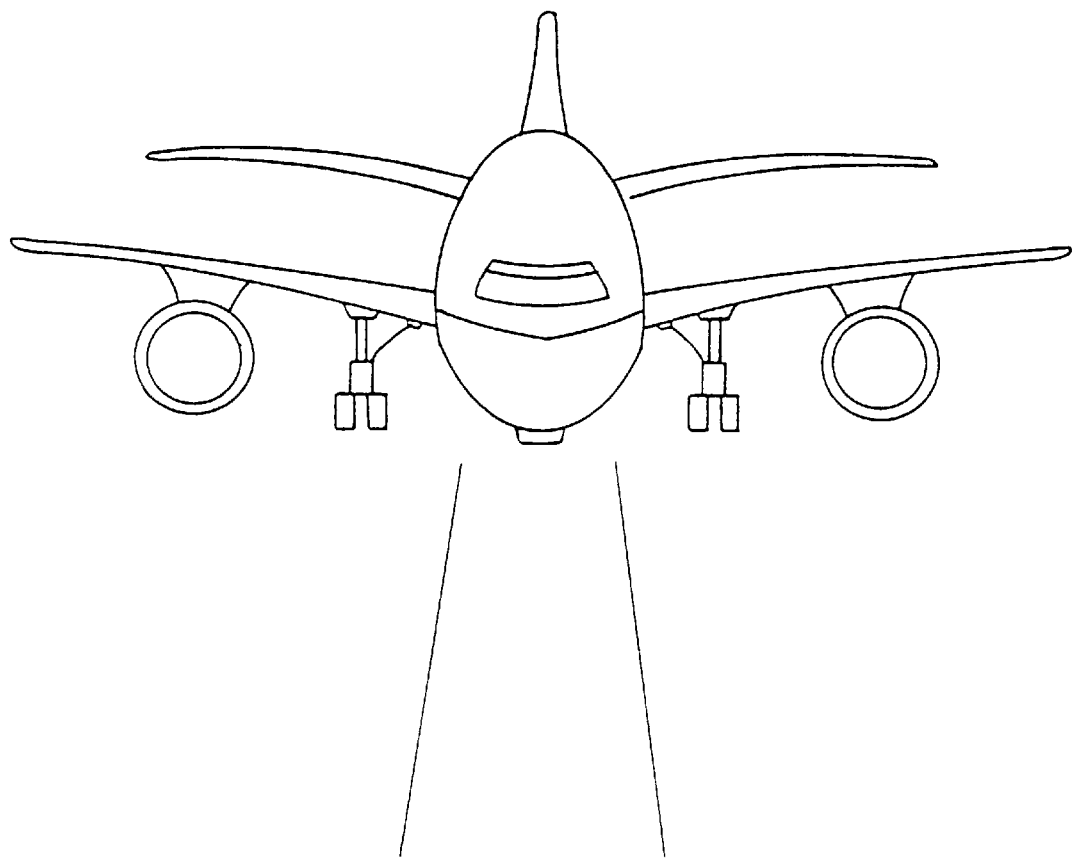

Finally, FIG. 5 shows an exemplary video sequence that the controller can position and arrange on his screen. Preferably, he can also zoom and view details. He can also call up the video sequences of the corresponding gate that he wants to monitor for display on his monitor. Finally, he can intervene if necessary via the input units of the computer workstation, for example, by producing instructions on the signal display panel. The video sequences are stored in the memory in compressed or decompressed form. For example, CD ROMs, floppy disks, or other storage media can then be archived and stored to be available for subsequent analysis.

The above description of the preferred embodiments has been given by way of example. From the disclosure given, those skilled in the art will not only understand the present invention and its attendant advantages, but will also find apparent various changes and modifications to the methods and structures disclosed. It is sought, therefore, to cover all such changes and modifications as fall within the spirit and scope of the invention, as defined by the appended claims, and equivalents thereof.

What is claimed is:

1. A process for automatically guiding an aircraft to a parking position in a parking zone, comprising:
    (a) detecting the aircraft by at least one video camera and outputting video signals;
    (b) supplying the video signals from the at least one video camera to an evaluation unit;
    (c) in the evaluation unit, determining the current position of the aircraft from the video signals;
    (d) in the evaluation unit, determining correction instructions for direction and speed of the aircraft from the video signals;
    (e) transmitting the correction instructions to the aircraft;
    (f) processing the video signals into video sequences;
    (g) storing the video sequences on a storage medium;
    (h) displaying the correction instructions and the video sequences on a control monitor of a ground control together with additional monitoring data; and
    (i) calling up the video sequences and the additional monitoring data on the control monitor of the ground control.

2. The process as claimed in claim 1 wherein the processing of the video signals into video sequences in the processing step (f) is performed in the evaluation unit.

3. The process as claimed in claim 1, further comprising compressing the video sequences prior to the storing step (g).

4. The process as claimed in claim 1 wherein the video sequences are stored on mobile storage units in the storing step (g).

5. The process as claimed in claim 1 wherein two video cameras with substantially identical detection areas detect the aircraft in the detecting step (a).

6. The process as claimed in claim 1 wherein, in the processing step (f), the video signals are digitized and processed into digital sequences, which are subsequently processed to provide the video sequences.

7. The process as claimed in claim 6, further comprising positioning the display of the video sequences on the control monitor in the displaying step (h) in accordance with an operator input command.

8. The process as claimed in claim 6, further comprising adjusting the display of the video sequences on the control monitor with respect to size in the displaying step (h) in accordance with an operator input command.

9. The process as claimed in claim 6, further comprising zooming the display of the video sequences on the control monitor in the displaying step (h) in accordance with an operator input command.

10. A device for automatically guiding an aircraft to a parking position in a parking zone, comprising:
    at least one video camera located in the parking zone to detect the aircraft and to output video signals;
    at least one evaluation unit connected with the at least one video camera to determine correction instructions for direction and speed of the aircraft and to provide video sequences from the video signals;
    a signal transmission unit to transmit the correction instructions to the aircraft;
    a video sequence transmission unit to make the video sequences and additional monitoring data available for call-up by ground control personnel; and
    at least one storage unit to store the video sequences.

11. The device as claimed in claim 10 wherein the storage unit comprises a disk unit.

12. A system to operate an automatically supported guidance of aircraft to parking positions at an airport, comprising:
    a plurality of subsystems, each subsystem being located at a respective gate of the airport and having:
        two video cameras located in a parking zone of the respective gate to detect the aircraft and to output video signals;
        an evaluation unit connected with the two video cameras to determine correction instructions for direction and speed of the aircraft and to provide video sequences from the video signals;
        a display panel to transmit the correction instructions to the aircraft; and
        an operator panel connected to the display panel to allow an operator to issue manual correction instructions to the aircraft if the two video cameras are not used;
    a communications network connected to the plurality of subsystems to exchange data among the plurality of subsystems;
    a video network connected to the plurality of subsystems to exchange video sequences among the plurality of subsystems; and
    a gate-planning station having:
        a computer workstation to process and call-up the video sequences and additional monitoring data by a controller for planning assignments of the aircraft to the gates and controlling the guidance of the aircraft to the parking positions at the gates; and
        a monitor to display the video sequences and the additional monitoring data to the controller.

13. The system as claimed in claim 12, further comprising a storage unit which is connected to the computer workstation.

* * * * *